United States Patent
Sperry et al.

(10) Patent No.: US 6,253,919 B1
(45) Date of Patent: Jul. 3, 2001

(54) INFLATABLE PACKING MATERIAL

(75) Inventors: Laurence B. Sperry, Brighton; Eric Kane, Lynn, both of MA (US)

(73) Assignee: Sealed Air Corporation, Danbury, CT (US)

( * ) Notice: Subject to any disclaimer, the term of this patent is extended or adjusted under 35 U.S.C. 154(b) by 0 days.

(21) Appl. No.: 09/059,791

(22) Filed: Apr. 13, 1998

(51) Int. Cl.$^7$ ................................................. B65D 23/00
(52) U.S. Cl. ............................................. 206/522; 383/3
(58) Field of Search ................................. 206/521, 522, 206/524.8; 383/3

(56) References Cited

U.S. PATENT DOCUMENTS

| | | |
|---|---|---|
| 383,964 | 6/1888 | MacKintosh . |
| 1,213,518 | 1/1917 | McEwen . |
| 2,530,504 | 11/1950 | Boyer . |
| 3,398,501 | 8/1968 | Aninger . |
| 3,514,157 | 5/1970 | Geiser . |
| 3,733,005 | 5/1973 | Frieder, Jr. . |
| 3,808,981 * | 5/1974 | Shaw .................................. 206/522 |
| 3,868,026 * | 2/1975 | Baxter .................................. 206/522 |
| 3,877,719 | 4/1975 | Lewis et al. . |
| 3,889,743 | 6/1975 | Presnick . |
| 3,891,082 | 6/1975 | Fall . |
| 4,146,069 | 3/1979 | Angarola et al. . |
| 4,146,070 | 3/1979 | Angarola et al. . |
| 4,215,778 | 8/1980 | Kovins . |
| 4,240,556 | 12/1980 | Field . |
| 4,262,801 | 4/1981 | Avery . |
| 4,267,684 | 5/1981 | Ambrose . |
| 4,465,188 | 8/1984 | Soroka et al. . |
| 4,489,833 | 12/1984 | Bauer . |
| 4,569,082 | 2/1986 | Ainsworth et al. . |
| 4,573,202 | 2/1986 | Lee . |
| 4,597,244 | 7/1986 | Pharo . |
| 4,640,080 | 2/1987 | Wright . |
| 4,793,123 | 12/1988 | Pharo . |
| 4,872,558 | 10/1989 | Pharo . |
| 4,874,093 | 10/1989 | Pharo . |
| 4,877,334 | 10/1989 | Cope . |
| 4,892,124 | 1/1990 | Thomsen . |
| 4,905,835 | 3/1990 | Pivert et al. . |
| 4,917,646 | 4/1990 | Kieves . |
| 4,918,904 | 4/1990 | Pharo . |
| 4,966,185 | 10/1990 | Schram . |
| 5,022,527 | 6/1991 | Braeutigam . |

(List continued on next page.)

FOREIGN PATENT DOCUMENTS

| | | |
|---|---|---|
| 40 30 919 A1 | 4/1991 | (DE) . |
| 2 073 269 | 1/1971 | (FR) . |
| 2456677 | 12/1980 | (FR) . |
| 1253325 | 1/1991 | (FR) . |
| 47-46063 | 12/1972 | (JP) . |
| 51-58774 | 5/1976 | (JP) . |
| 64-23488 | 2/1989 | (JP) . |
| 10-129730 | 5/1998 | (JP) . |
| 10-129731 | 5/1998 | (JP) . |
| 85/00151 | 1/1985 | (WO) . |
| 98/14390 | 4/1998 | (WO) . |

OTHER PUBLICATIONS

Inflatable Packaging Incorporated product brochure.
Impackt, L.L.C. product brochure.
Sealed Air Corporation product brochure (Vistaflex).
Sealed Air Corporation product brochure (VoidPak).

*Primary Examiner*—Jacob K. Ackun
(74) *Attorney, Agent, or Firm*—Fish & Richardson P.C.

(57) ABSTRACT

A dunnage bag includes a sealed, flexible bag, and a rigid valve assembly connected in fluid communication to the flexible bag. The valve assembly has a rigid collar which mounts in an opening in a wall of a container to receive an exit end of a fill nozzle of an inflating system which supplies pressurized gas for inflating the flexible bag.

21 Claims, 17 Drawing Sheets

U.S. PATENT DOCUMENTS

| | | |
|---|---|---|
| 5,042,541 | 8/1991 | Krier et al. . |
| 5,121,840 | 6/1992 | Schram . |
| 5,240,135 | 8/1993 | Lepinoy . |
| 5,272,856 | 12/1993 | Pharo . |
| 5,275,290 | 1/1994 | Bierfreund . |
| 5,288,188 | 2/1994 | Vance . |
| 5,335,486 | 8/1994 | Davis . |
| 5,339,602 | 8/1994 | Landers et al. . |
| 5,396,998 * | 3/1995 | Chaisson ............................ 206/522 |
| 5,397,000 | 3/1995 | Holte et al. . |
| 5,454,642 | 10/1995 | De Luca . |
| 5,552,003 | 9/1996 | Hoover et al. . |
| 5,651,237 | 7/1997 | De Luca . |
| 5,901,850 | 5/1999 | Jones et al. . |

\* cited by examiner

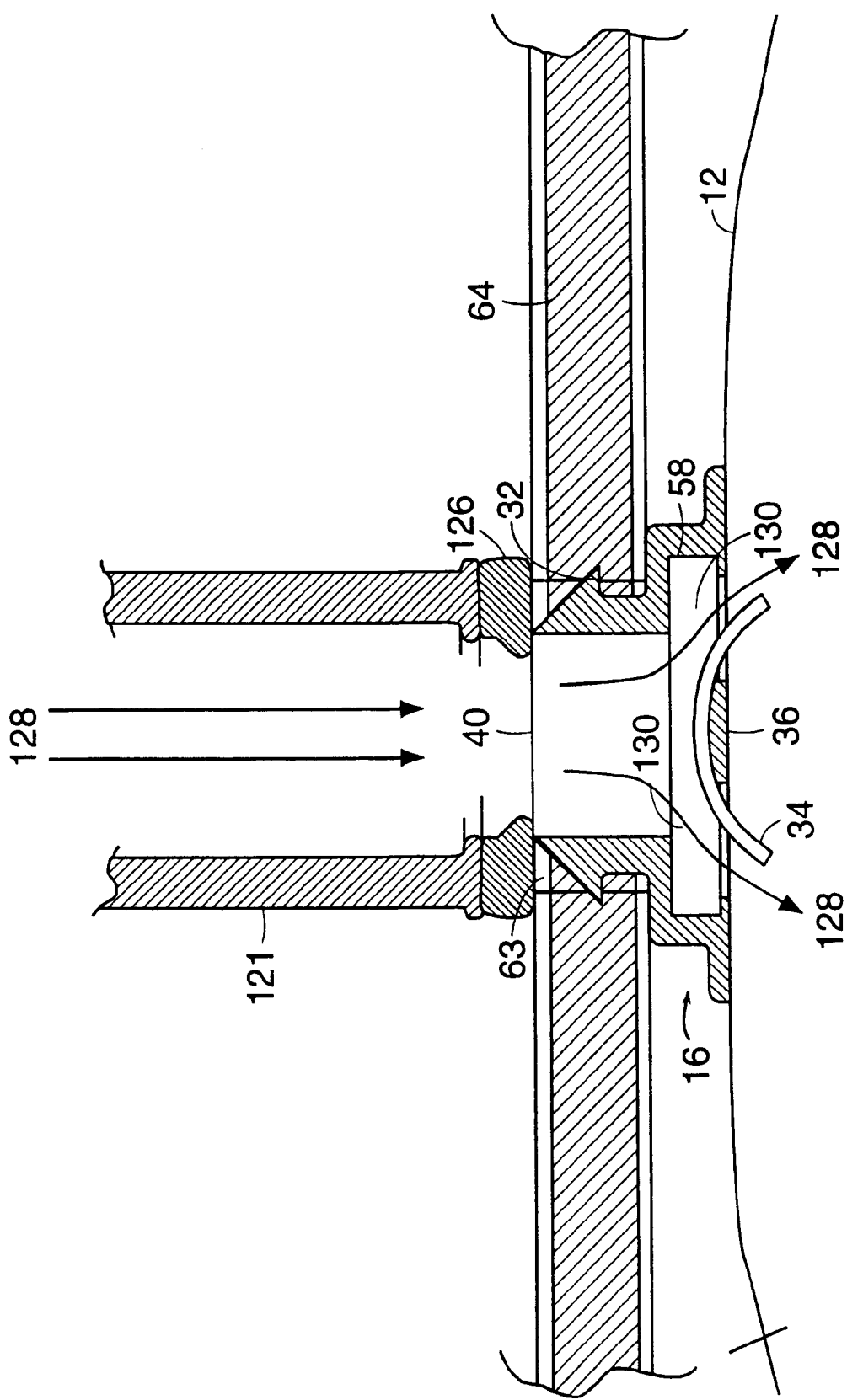

INFLATABLE PACKING MATERIAL

BACKGROUND OF THE INVENTION

This invention relates to inflatable packing material, in particular dunnage air bags.

Dunnage air bags are typically used to fill void regions in containers carrying articles for shipment. When the bag is inflated, the article is wedged between the bag and the walls of the container or between portions of the bag. Thus the article is prevented from moving around in the container while being shipped. The bag is usually made from a puncture resistant material to ensure that the bag remains inflated during the shipment of the article.

SUMMARY OF THE INVENTION

In general, according to one aspect of the invention, a dunnage bag includes a sealed, flexible bag, and a rigid valve assembly connected in fluid communication to the flexible bag. The valve assembly has a rigid collar which mounts in an opening in a wall of a container to receive an exit end of a fill nozzle of an inflating system which supplies pressurized gas for inflating the flexible bag.

Embodiments of this aspect of the invention may include one or more of the following features. The flexible bag includes a pleat for relieving strain on the flexible bag near the valve assembly when the dunnage bag is in use in the container. The flexible bag has a quilted construction. The collar includes a first rim located at an entrance end of the collar and a second rim spaced apart from the first rim. The first rim has a smaller diameter than the second rim and a larger diameter than a portion of the collar located between the first rim and the second rim. The first rim is tapered to sealably engage the exit end of the fill nozzle. The rigid collar is configured so that the entrance end of the collar is flush with an outer surface of the wall of the container when the rigid collar is mounted in the wall. Alternatively, the rigid collar is configured so that the entrance end of the collar is recessed from an outer surface of the wall of the container when the rigid collar is mounted in the wall.

In other embodiments of this aspect, the rigid collar includes a third rim spaced apart from the second rim, where the third rim extends inwardly into a bore defined by the rigid collar. The rigid collar is configured so that the entrance end of the collar protrudes from an outer surface of the wall of the container when the rigid collar is mounted in the wall.

In another aspect of the invention, a dunnage bag includes a sealed, flexible bag, and a flexible valve assembly connected in fluid communication to the flexible bag at a first end of the valve assembly. The valve assembly has a rigid collar at another end of the valve assembly which mounts in an opening in a wall of a container to receive a fill nozzle of an inflating system which supplies pressured gas for inflating the flexible bag.

Embodiments of this aspect of the invention may include any of the features discussed above, as well as the following additional features. The flexible bag includes two opposed sides and the first end of the valve assembly is connected to the flexible bag near a center region of one of the two opposed sides. Alternatively, the flexible bag includes two opposed sides and the first end of the valve assembly is connected to the flexible bag near an edge of the flexible bag.

In another aspect of the invention, a dunnage bag includes a sealed, flexible bag, and a valve assembly connected in fluid communication to the flexible bag. The valve assembly has a rigid collar which mounts in an opening in a wall of a container to receive a fill nozzle of an inflating system which supplies pressurized gas for inflating the flexible bag. The collar has a first rim located at an entrance end of the collar and a second rim positioned next to the first rim. The first rim has a smaller diameter than the second rim and a larger diameter than a portion of the collar located between the first rim and the second rim.

Embodiments of this aspect of the invention may include any of the features discussed above.

In still another aspect of the invention, a dunnage bag includes a sealed, flexible bag, and a flexible valve assembly connected in fluid communication to the flexible bag at an end of the valve assembly. The valve assembly has an outer portion with an adhesive for attaching the outer portion to a wall of a container to receive a fill nozzle of an inflating system which supplies pressured gas for inflating the flexible bag.

Embodiments of this aspect of the invention may also include any of the features discussed above.

In another aspect of the invention, a dunnage bag includes a sealed, flexible bag having multiple protrusions extending outwardly from a surface of the flexible bag, and a valve assembly connected in fluid communication to the flexible bag. The valve assembly is configured to receive an exit end of a fill nozzle of an inflating system which supplies pressurized gas for inflating the flexible bag.

In yet another aspect of the invention, a dunnage bag includes a sealed, flexible bag which has a first portion with a substantially smooth outer surface, and a second portion with a quilted construction, and a valve assembly connected in fluid communication to the flexible bag. The valve assembly is configured to receive an exit end of a fill nozzle of an inflating system which supplies pressurized gas for inflating the flexible bag.

In still another aspect of the invention, a dunnage bag includes a container, a sealed, flexible bag disposed within and attached to the container, and a valve assembly connected in fluid communication to the flexible bag. The valve assembly is configured to receive an exit end of a fill nozzle of an inflating system which supplies pressurized gas for inflating the flexible bag.

In another aspect of the invention, a packaging system includes an inflating system which provides pressurized gas for inflating a dunnage bag disposed within a rigid container holding an article; a taping system which applies tape on the container to seal the container; and a conveying system which transports the container to and from the inflating system and the taping system. The taping system is attached to the conveying system.

Embodiments of this aspect of the invention may include one or more of the following features. The packaging system includes a controller which causes the taping system and inflating system to perform automatically. The inflating system includes a pressure regulation system which controls the inflation of the bag. The pressure regulation system is controlled by a feedback controller such that the bag is inflated in stages. The feedback controller monitors the pressure within the bag and the flow rate of air to the bag. The packaging system includes a swell detector which detects deflection of a wall of the container during inflation of the dunnage bag. The inflating system and taping system are activated manually. The inflating system includes a fill nozzle having a pliable material at an exit end of the nozzle which sealably engages with a collar of a valve assembly connected in fluid communication with the bag. The packaging system includes a sound generator which produces a sound such that the amplitude and pitch of the sound corresponds to the flow rate of air through the sound generator.

In still another embodiment of the invention, an inflating system includes a fill nozzle which engages with an entrance end of a valve assembly of a dunnage bag for supplying pressurized gas to the bag for inflating the bag, and a pressure regulation system which controls the inflation of the bag.

Embodiments of this aspect of the invention may include one or more of the following features. The pressure regulation system is controlled by a feedback controller such that the bag is inflated in stages. The feedback controller monitors the pressure within the bag and the flow rate of air to the bag. The fill nozzle includes a pliable material at an exit end of the nozzle which sealably engages with a collar of a valve assembly connected in fluid communication with the bag. The inflating system includes a swell detector which detects deflection of a wall of a container during inflation of the dunnage bag disposed within the container.

In yet another aspect of the invention, an inflating system includes a fill nozzle which engages with an entrance end of a valve assembly of a dunnage bag for supplying pressurized gas to the bag for inflating the bag, and a swell detector which detects deflection of a wall of a container during inflation of a bag within the container. In certain embodiments of this aspect, the swell detector is a linear transducer.

In another aspect of the invention, a method for packaging an article includes placing a dunnage bag inside a rigid container along with the article; mounting a valve assembly of the dunnage bag in an opening in a wall of the container; and, by means of an automated system, supplying pressurized gas to the valve assembly to inflate the bag; and sealing the container with tape. The dunnage bag includes a sealed, flexible bag, and the valve assembly connected in fluid communication to the bag.

In some embodiments of this aspect of the invention, the step of supplying is performed before the step of sealing. And in other embodiments, the step of supplying is performed after the step of sealing.

Among other advantages, the dunnage bag facilitates packaging articles for shipment quickly. The bag requires less material to assemble than the prior art. In at least one embodiment, the valve assembly does not protrude outside the container and thus can not be snagged and ripped out of the container. The inflation of the bag can be readily automated. The packaging system is able to inflate the bag and seal the container simultaneously without requiring manual intervention from an operator.

Other features and advantages of the invention will become apparent from the following detailed description and from the claims.

BRIEF DESCRIPTION OF THE DRAWINGS

FIG. 4B is a side cross-sectional view of the rigid valve assembly of the dunnage bag of FIG. 1 during inflation of the bag;

DESCRIPTION OF THE PREFERRED EMBODIMENTS

Figure 1:
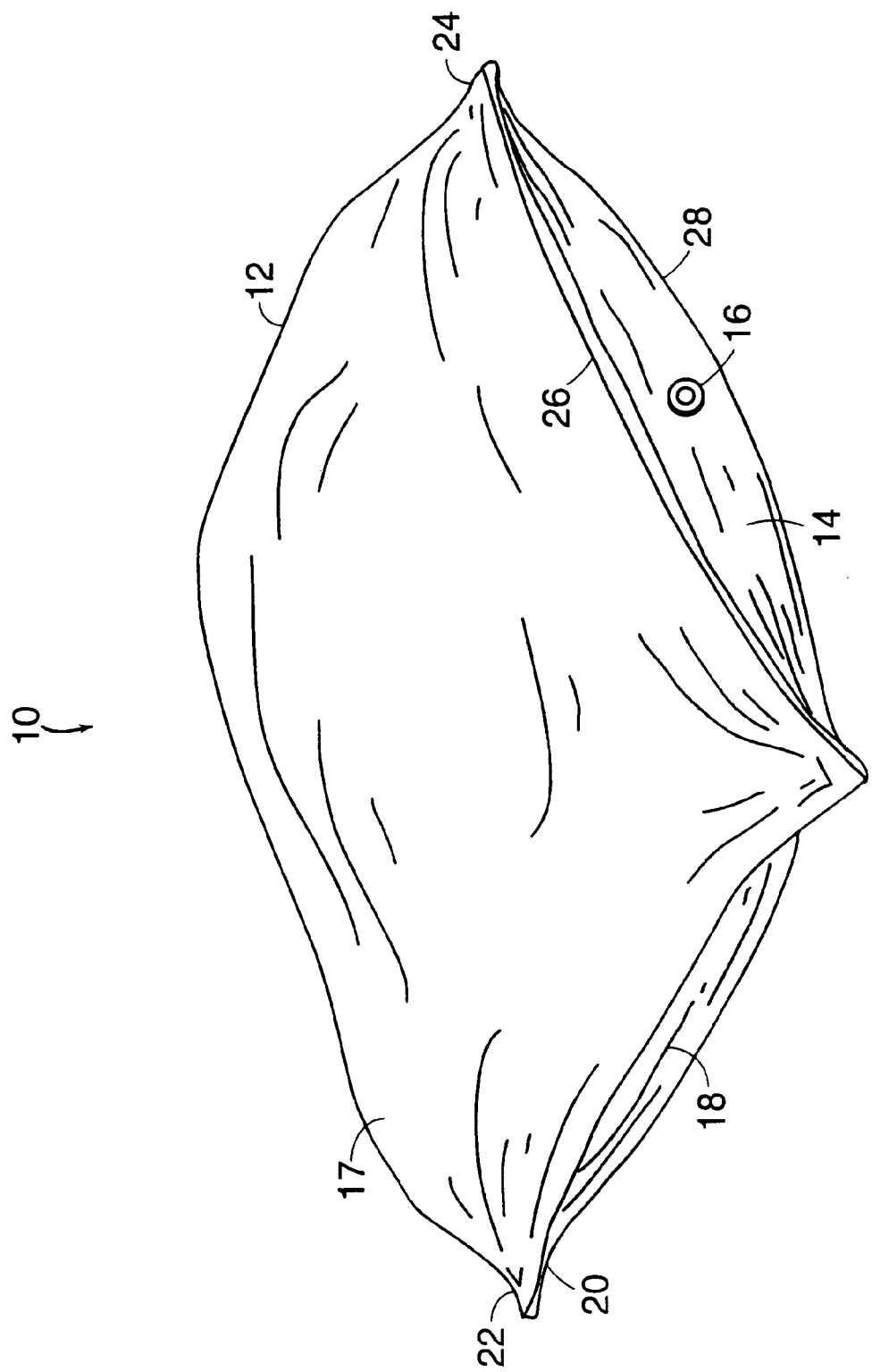
FIG. 1 is an illustration of a dunnage bag incorporating a rigid valve assembly.

Referring to FIG. 1, a dunnage bag 10 includes a flexible bag 12 with a pleat 14, and a rigid valve assembly 16 mounted in the pleat. Two opposed sides 17, 18 of flexible bag 12 are sealed along three edges 20, 22, 24, and pleat 14 is sealed along a pair of edges 26, 28 with opposed sides 17, 18, respectively. Pleat 14 is a folded piece of material that unfolds when dunnage bag 10 is inflated to provide increased volume expansion of the bag. Side 18 also includes a fold (not shown) that unfolds to provide further volume expansion of bag 10 when the bag is inflated.

Flexible bag 12 is typically made from a pliable, sealable material, for example linear, low density polyethylene. Flexible bag 12 can also be made from other materials including medium or high density polyethylene. Flexible bag 12 can also include a polyester or nylon outer layer, for strength and abrasion resistance, and a low-density polyethylene inner bag for heat sealability.

Figure 2A:
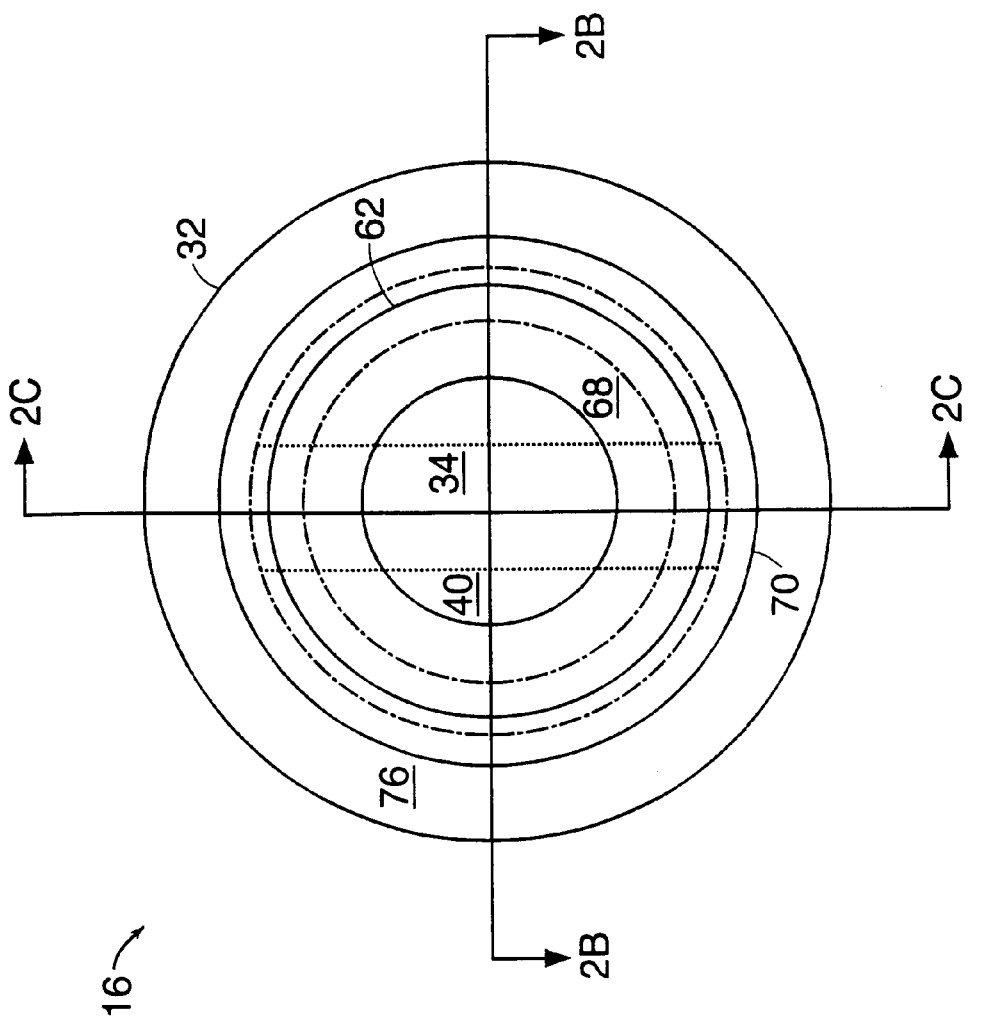
FIG. 2A is a front view of the rigid valve assembly of the dunnage bag of FIG. 1.
Figure 2B:
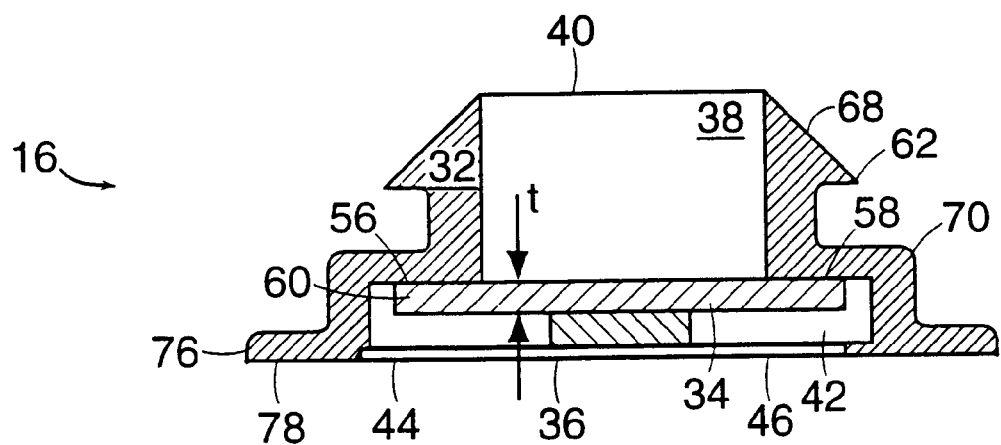
FIG. 2B is a side cross-sectional view along line 2B—2B of FIG. 2A.
Figure 2C:
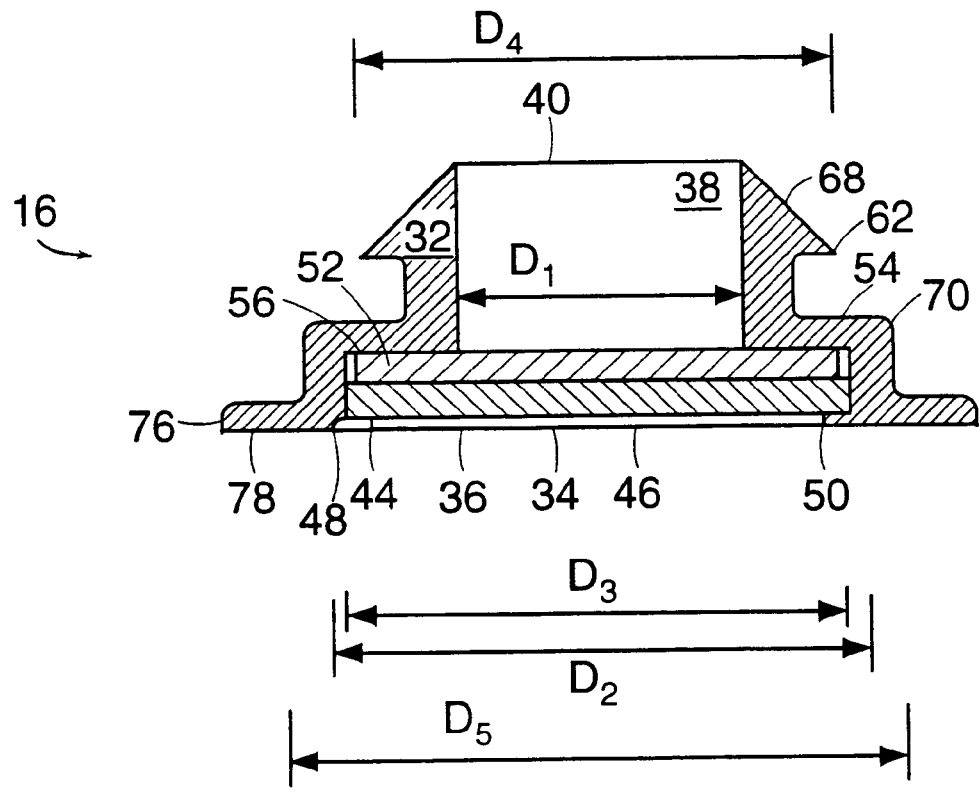
FIG. 2C is a side cross-sectional view along line 2C—2C of FIG. 2A.

Referring to FIGS. 2A–2C, rigid valve assembly 16 includes a housing 32, and a circular diaphragm 34 secured within housing 32 by a retainer post 36. Housing 32 defines a bore 38 which extends from an entrance opening 40 of housing 32 to an enlarged bore 42 located at the other end of the housing. A circular ledge 44 extends inwardly into enlarged bore 42 and defines an exit opening 46. Retainer post 36 includes two ends 48, 50 engaged with ledge 44 of housing 32 such that two outer portions 52, 54 of diaphragm 34 are held against a surface 56 of housing 32 to hold diaphragm 34 within housing 32. Diaphragm 34 includes two side portions 58, 60 located on either side of retainer post 36. Portions 58, 60 of diaphragm 34 mate up against surface 56 of housing 32 to form a seal, when flexible bag 12 is inflated to about 2 to 3 psi. Housing 32 includes an outwardly extending rim 62 which has a tapered surface 68, and an outwardly extending shoulder 70 spaced from rim 62. Shoulder 70 is larger in diameter than rim 62. A base portion 76 of housing 32 includes another surface 78 which is adhered to flexible bag 12.

In the embodiment of the valve assembly illustrated in FIGS. 2A–2C, bore 38 has a diameter, $D_1$, of about 0.3 inch. The diameter, $D_2$, of enlarged bore 38 is about 0.6 inch, and exit opening 46 defined by circular ledge 44 has a diameter, $D_3$, of about 0.55 inch. Rim 62 has an outer diameter, $D_4$, of about 0.5 inch, and shoulder 70 has an outer diameter $D_5$ of about 0.7 inch.

Housing 32 is made from the same material as flexible bag 12 to facilitate heat sealing housing 32 to flexible bag 12 by, for example, ultrasonic welding. Diaphragm 34 is made from chlorofluro-silicon having a thickness, t, of about 0.010 inch. Diaphragm 34 can also be made from other suitable materials which have a memory which causes portions 56, 58 of diaphragm 34 to spring back, after inflation, and abut against surface 56 to form a seal. The Shore A durometer of the diaphragm ranges between 30 and 60 so that the diaphragm is soft enough to ensure proper sealing between diaphragm 34 and surface 56. A coat of oil, for example silicon, is typically applied to the surface of diaphragm 34 which is adjacent to surface 56 to enhance the sealing capabilities of the diaphragm. Retainer post 36 is typically made from Delrin™ or other suitable materials, including PVC and high density polyethylene to provide a desired stiffness to retainer post 36.

Figure 2D:
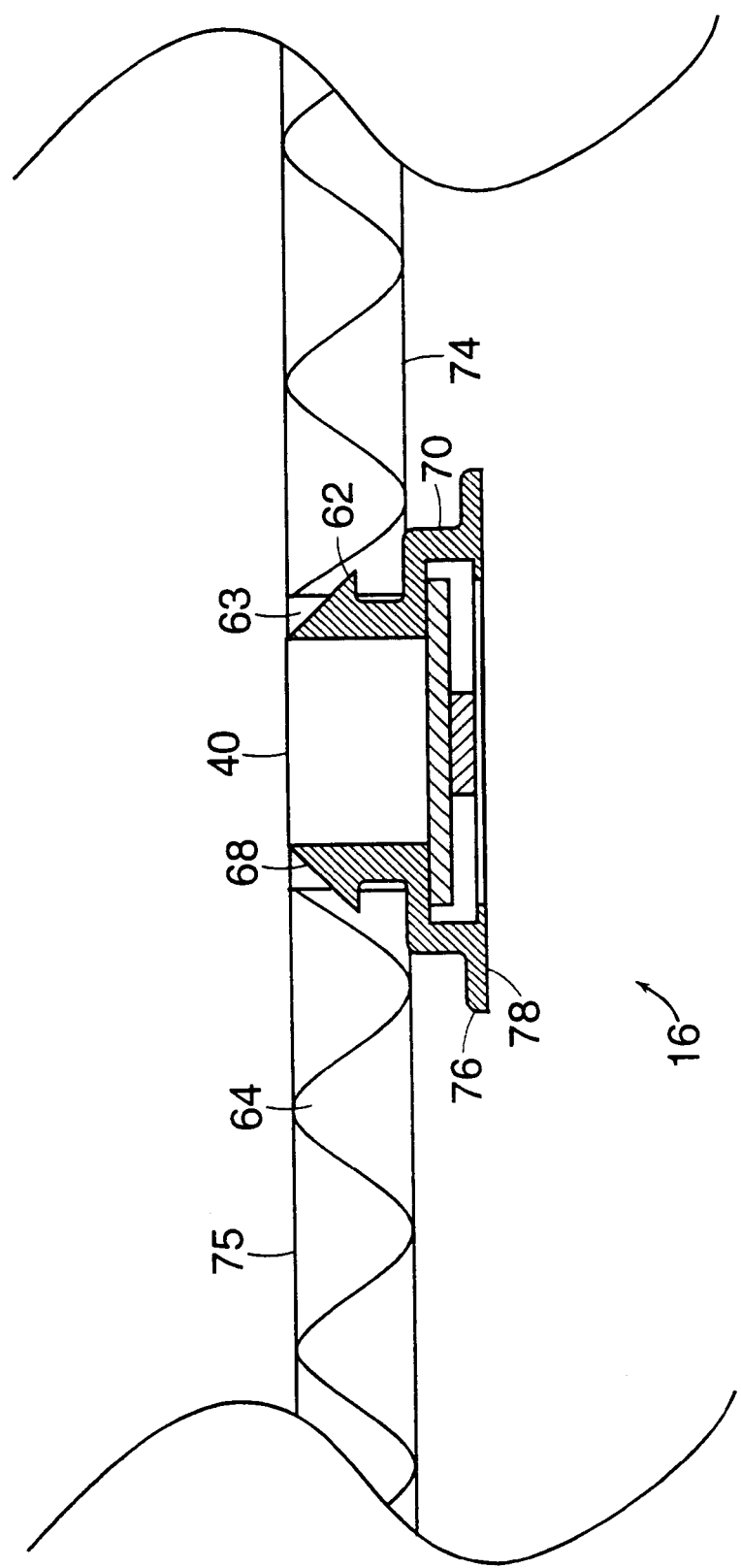
FIG. 2D is a side cross-sectional view of the rigid valve assembly of FIG. 2A mounted in an opening of a wall of a container.

In use, as shown in FIG. 2D, rim 62 of housing 32 engages with a wall 64 of a container 66 (FIG. 3) in an opening 63. Opening 63 is smaller in diameter than that of rim 62. Tapered surface 68 of rim 62 facilitates insertion of rigid valve assembly 16 into opening 63. In addition, tapered surface 68 helps form a seal with a fill nozzle 121 (FIG. 4B) during inflation of bag 12. Shoulder 70 of housing 32 abuts against an inner surface 74 of wall 64 to prevent rigid housing 32 from being pushed through wall 64 when rigid housing 32 is inserted into the wall. Contact of shoulder 70 of housing 32 with surface 74 of wall 64 provides tactile feedback to an operator that rigid valve assembly 16 is fully in place when snapped into the wall of the container. When rigid valve assembly 16 is mounted in opening 63, entrance opening 40 is flush with or recessed from an outer surface 75 of wall 64. In other words, entrance opening 40 does not protrude outwardly beyond outer surface 75. Rigid valve assembly 16 is used with containers having wall thicknesses which range from about 0.0625 inch to about 0.3 inch. Opening 63 typically has a diameter of about 0.375 inch.

Figure 3:
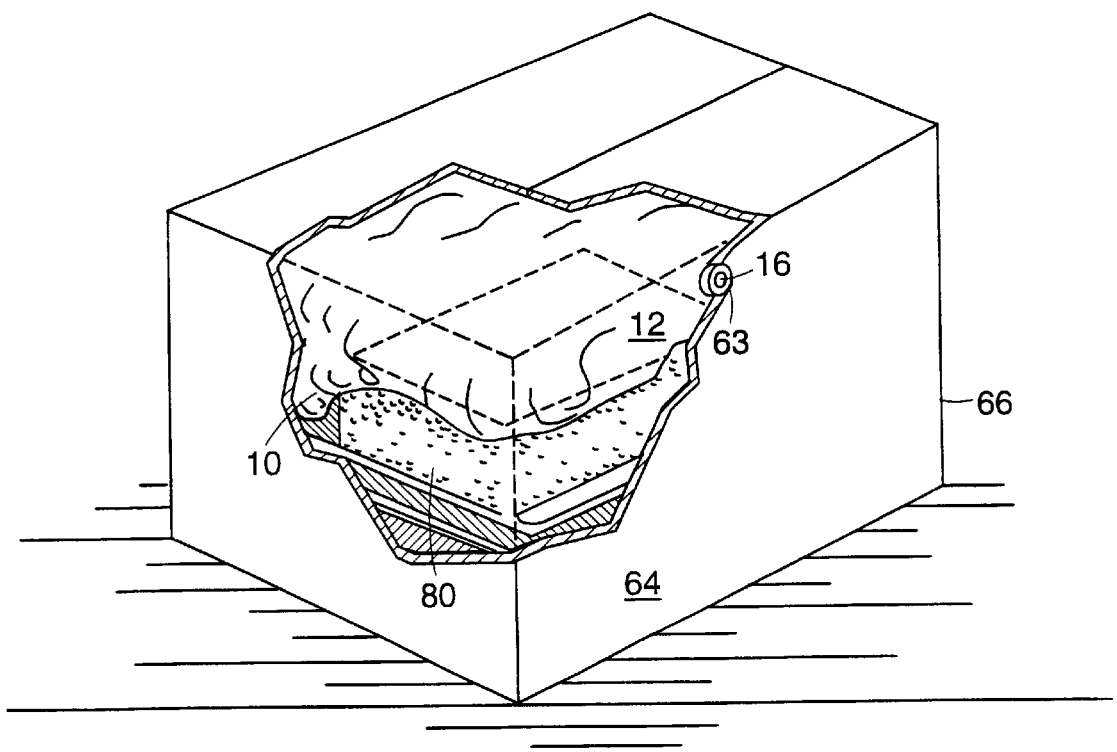
FIG. 3 is a perspective view of the dunnage bag of FIG. 1 in use in a container.

Referring to FIG. 3, dunnage bag 10 is shown fully inflated in container 66 holding several articles 80. Rigid valve assembly 16 is mounted in opening 63 in wall 64 of container 66. Rigid valve assembly 16 is located close to edge 28 (FIG. 1) of flexible bag 12 to allow pleat 26 (FIG. 1) to fully unfold to maximize the volume expansion of the bag so that the bag conforms about articles 80 carried within the container. Further, pleat 26 relieves the strain on flexible bag 12 near the region around rigid valve assembly 16. Dunnage bag 10 fills void regions within container 66 and wedges between articles 80 and the walls of container 66 to prevent these articles from moving within container 66 during shipment. Dunnage bag 10 is typically two to three inches larger in both width and length than that of container 66 to ensure that dunnage bag 10 properly fills the void regions about articles 80.

Figure 4A:
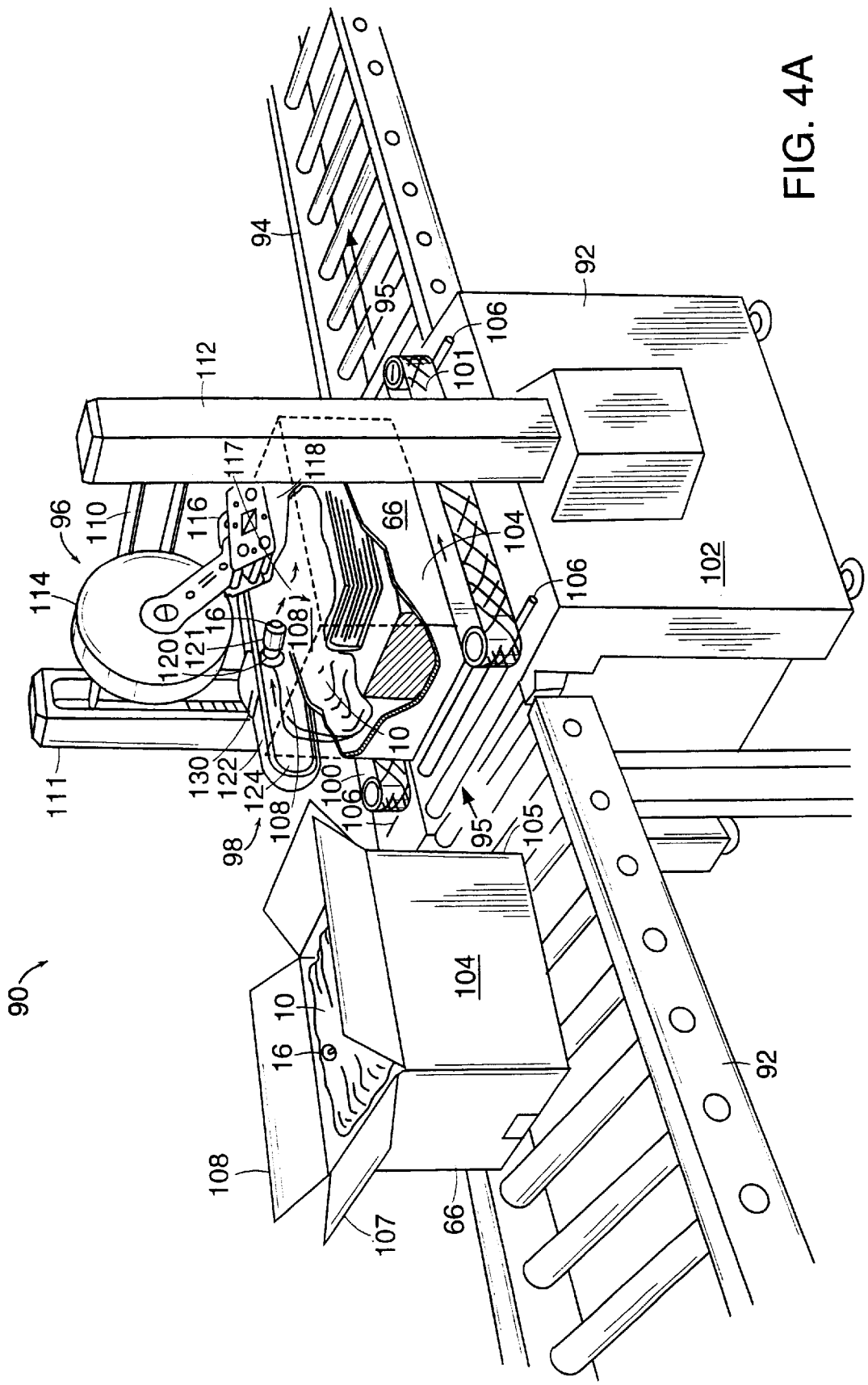
FIG. 4A is an illustration of a packaging system for inflating the dunnage bag of FIG. 1.

The following is a description of a system which automatically inflates the dunnage bag, and seals the container which holds the bag and articles for shipment. Referring to FIG. 4A, a packaging system 90 includes a pair of conveyors 92, 94 of a conveying system, and a taper/inflater station 97. Conveyor 92 transports container 66 in the direction of arrow 93 to station 97 after an operator mounts rigid valve assembly 16 in an opening of a wall of container 66, as shown in FIG. 2D. Next the operator folds a pair of minor flaps 107 and then a pair of major flaps 108 inward to a closed position. In station 97, a taper 96 seals the container and an inflating system 98 inflates dunnage bag 10. Conveyor 94 transports the packaged containers in the direction of arrow 95 away from station 97. A pair of belt drivers 100, 101 on either side of container 66 pulls the container through station 97. Each of belt drivers 100, 101 extend vertically from a base 102 of station 97, and are guided along a respective pair of slots 106. Belt drivers 100, 101 pneumatically push against a pair of vertical walls 104 (of which only one is shown) of container 66, thereby urging the walls inward to minimize a gap 117 at a top 118 of container 66 which is formed between major flaps 108 when the flaps are in a folded, closed position.

Taper 96 is supported on a cross bar 110 which is held by a pair of columns 111, 112 of station 97. Taper 96 includes a roll of tape 114 and a tape applying device 116. A sensor (not shown) detects the arrival and height of container 66, whereupon tape applying device 116 is pneumatically pushed by a pneumatic controller (not shown) against top 118 of container 66 with a predetermined force. As container 66 advances through station 97, tape applying device 116 applies a strip of tape along gap 117 to seal the container.

Inflating system 98 includes a pneumatically actuated arm 120 held in a housing 122 which is supported in column 111. Housing 122 is connected to cross bar 110 within column 111 so that housing 122 moves up and down along with tape applying device 116. The height of housing 122 and thus tape applying device 116 is pneumatically adjusted by the pneumatic controller. A fill nozzle 121 is held in arm 120 and is connected to a hose (not shown) which supplies compressed air to the fill nozzle. Fill nozzle 121 includes a pliable closed-cell foam end 126 (FIG. 4B) which sealably engages with entrance opening 40 of rigid valve assembly 16 during inflation of dunnage bag 10. Prior to the arrival of container 66 in station 97, arm 120 is urged rearward to a location 124 of housing 122. The speed of a motor (not shown) of belt drivers 100, 101 is monitored so that the precise speed of container 66 through station 97 is known. A sensor (not shown) positioned on station 97 determines a leading edge 105 of incoming container 66. The motor speed and the information from the sensors is used to determine the precise location of rigid valve assembly 16 when the valve assembly is mounted in opening 63 (FIG. 2D). In other words, the speed at which container 66 advances through station 97 and the location of leading edge 105 are known so that the precise time at which arm 120 pushes fill nozzle 121 against rigid valve assembly 16 is known. Thus, a predetermined time after leading edge 105 of container 66 is detected, arm 120 pushes fill nozzle 121 against rigid valve assembly 16 to begin the inflation sequence. Arm 120 is mounted on a mechanism which allows arm 120 to move forward in housing 122 with rigid valve assembly 16 as container 66 moves in the direction of arrow 130. After dunnage bag 10 is inflated, arm 120 and thus fill nozzle 121 are pulled away from rigid valve assembly 16. Arm 120 is then pneumatically urged rearward to location 124 of housing 122.

During inflation, as shown in FIG. 4B, end 126 of fill nozzle 121 sealably engages with entrance opening 40 of rigid valve assembly 16. Air flows in the direction of arrows 128 from fill nozzle 121 through rigid valve assembly 16 into flexible bag 12. The force of the flowing air folds diaphragm 34 around retainer post 36 to create a passageway 130 through rigid valve assembly 16. After inflation, diaphragm 34 snaps back against surface 56 of housing 32 because of the spring behavior of diaphragm 34 and the internal pressure inside flexible bag 12.

Figure 5:
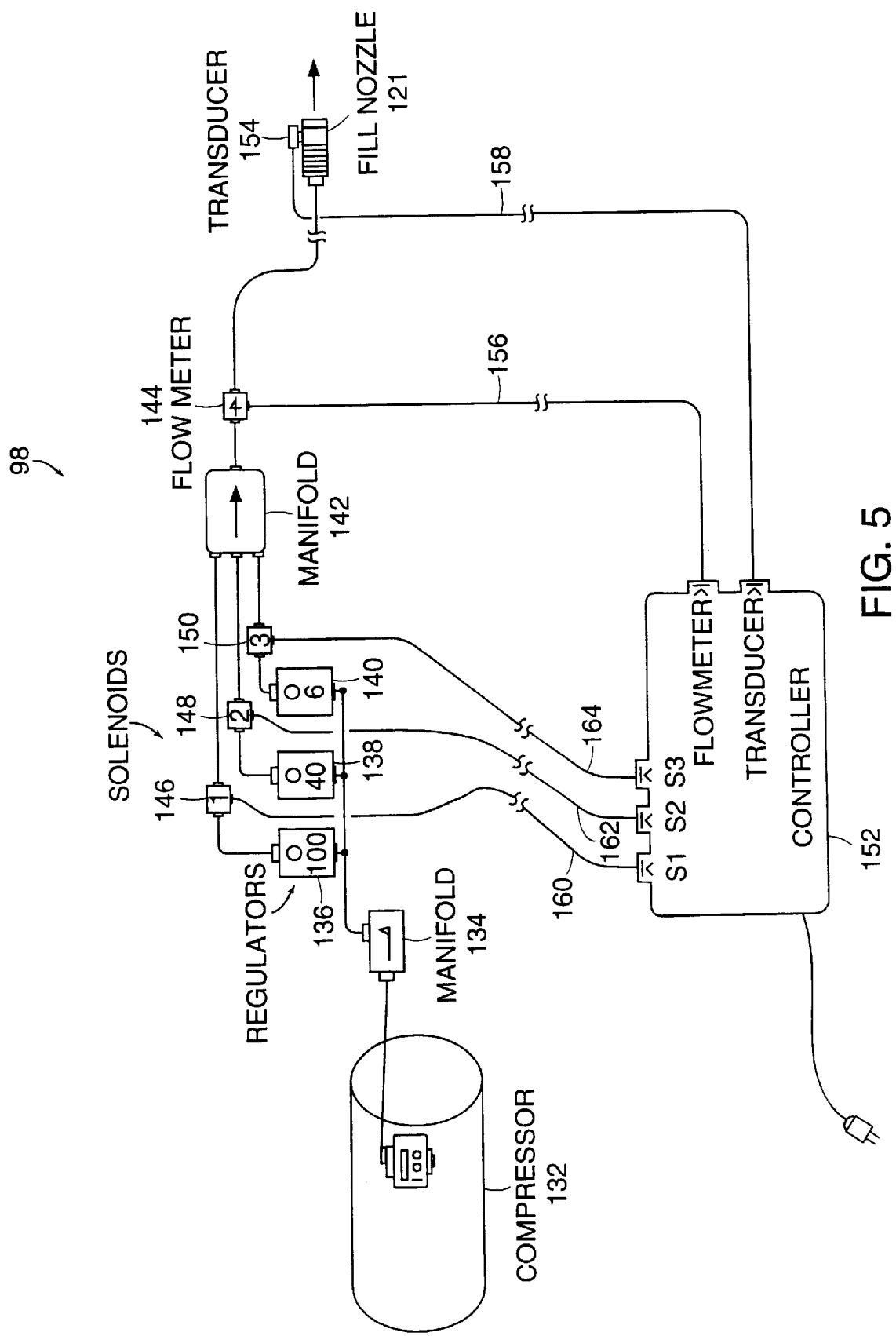
FIG. 5 is a block diagram of an inflating system for the packaging system of FIG. 4A.

Inflating system 98 is shown in greater detail in FIG. 5. Fill nozzle 121 of inflating system 98 is connected to a compressor 132 which supplies pressurized air for inflating dunnage bag 10. The pressurized air from compressor 132 is directed through a manifold 134 to three pressure regulators 136, 138 and 140 which reduce the supply pressure to 100 psi, 40 psi, and 6 psi, respectively. Regulators 136, 138 and 140 are connected in turn to a second manifold 142 which distributes the air through a flow meter 144 to fill nozzle 121. A flow meter 144 monitors the flow rate of air to fill nozzle 121. Three solenoids 146, 148, and 150 are located in the lines connecting manifold 142 and regulators 136, 138, and 140, respectively. Solenoids 146, 148, 150 and flow meter 144 are electrically connected to a controller 152, for example, a programmable logic controller. Controller 152 through the controlling of the operation and sequencing of solenoids 146, 148 and 150 controls the inflation sequence of the bag. A pressure transducer 154 which monitors the pressure within dunnage bag 10 is positioned near fill nozzle 121 and is electrically connected to controller 152. During inflation of dunnage bag 10, feedback signals from flow meter 144 and pressure transducer 154 are transmitted via a pair of control lines 156 and 158, respectively, to controller 152. When a desired pressure is detected, controller 152 terminates the inflation sequence. Typically, for a 0.3 ft$^3$ dunnage bag, air at 100 psi is first supplied for about 500 msec at a flow rate of about 600 liters/min, then at 40 psi supplied for about 500 msec at about 325 liters/min, and finally at 6 psi supplied for about 1 sec at a flow rate of about 100 liters/min. Thus, the total inflation process takes about 2 seconds.

In operation, container 66 is transported by conveyor 92 towards station 97. Prior to arrival at station 97, an operator places articles 80 inside container 66. Subsequently, an operator places dunnage bag 10 inside container 66 and mounts rigid valve assembly 16 in hole 63 of wall 64 of container 66 (FIG. 3). Alternatively, the operator can first place dunnage bag 10 inside container 66, and then place the articles on top of the bag. The operator then folds minor flaps 107 and major flaps 108 to a closed position. The subsequent packaging steps are fully automated. Belt drivers 100, 101 receive container 66 and pull the container through station 97. As container 66 advances through station 97, tape applying device 116 is activated by the pneumatic controller and applies a strip of tape along the top of container 66 thereby sealing gap 117 between major flaps 108 previously folded by the operator. A sensor (not shown) detects leading edge 105 of container 66, and then after a predetermined time the pneumatic controller (not shown) actuates arm 120. Arm 120 pushes fill nozzle 121 against rigid valve assembly 16, and the inflation process begins. Fill nozzle 121 moves with container 66 while dunnage bag 10 is being inflated. The entire inflation process takes about 3 seconds. After dunnage bag 10 is inflated, fill nozzle 121 is pneumatically pulled from rigid valve assembly 16, and arm 120 is pneumatically returned to its initial position. Packaging system 90 is capable of packaging about 15 containers per minute.

In other embodiments of the packaging system, controller 152 can be a CPU running software instead of a programmable logic controller. Each of taper 96 and inflating system 98 can be a stand alone system. Thus the dunnage bag may be inflated prior to or after the sealing of the container is completed. Solenoids 146, 148, 150 can each be activated for a predetermined time. The location of rigid valve assembly 16 when it is mounted in opening 63 can be determined by a pattern recognition system. In addition to the sensor used to detect the leading edge of the container, there can be an additional sensor to detect the trailing edge of the container so that the width of the container can be determined. The known width then enables the packaging system to determine the time at which arm 120 forces fill nozzle 121 against the rigid valve assembly for containers of various widths. In other embodiments, the pitch and amplitude of the noise generated by the flow of air through the fill nozzle can be used to monitor the inflation sequence.

Figure 6:
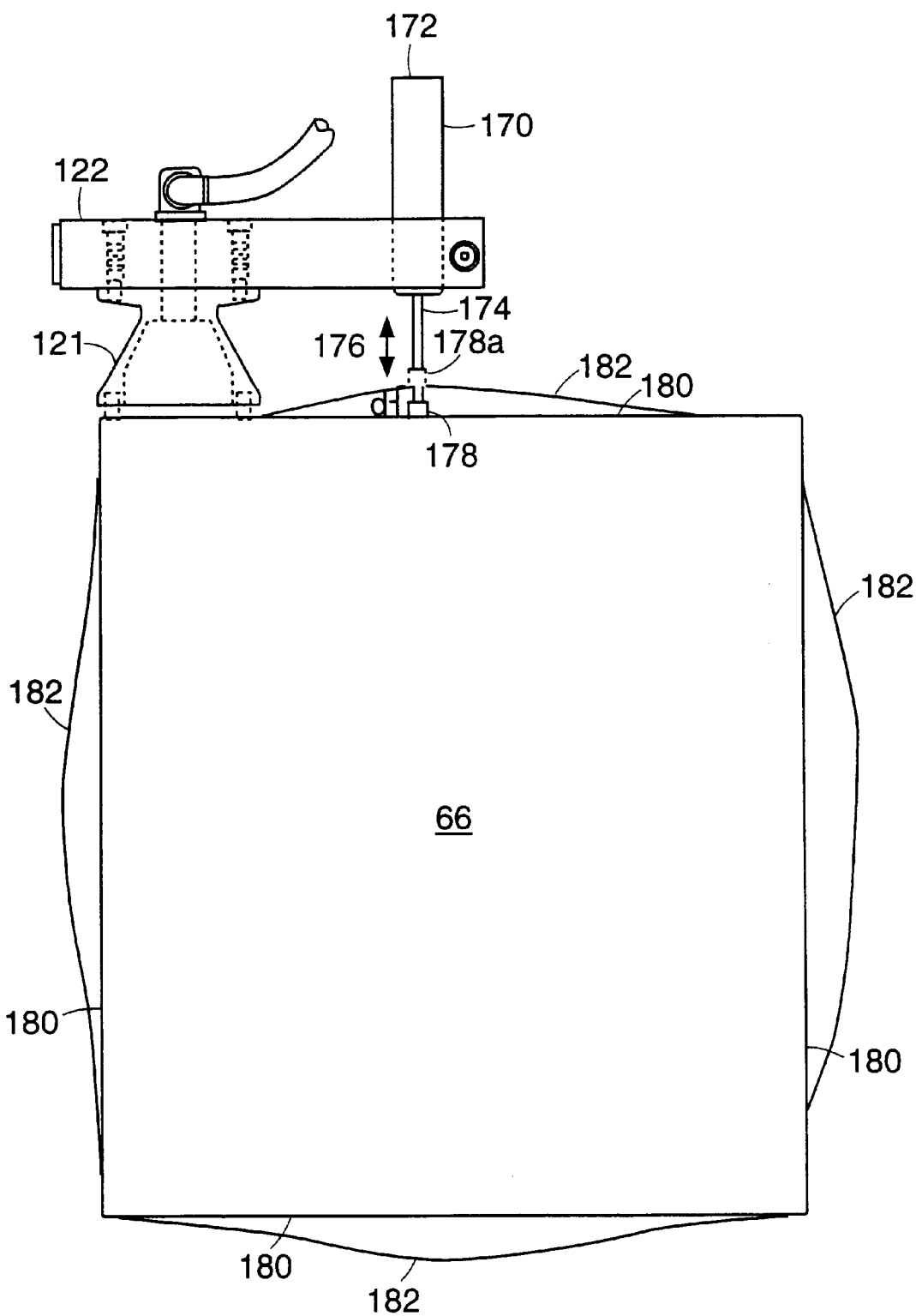
FIG. 6 is a partial top view of an alternative embodiment of a packaging system incorporating a box swell detector.

In another embodiment of the packaging system, as shown in FIG. 6, housing 122 holds a swell detector 170. Swell detector 170 is typically a linear transducer which includes a body 172, and a rod 174 that moves in and out of body 172 as indicated by double arrows 176. An enlarged head 178 is attached to an end of rod 174.

When container 66 arrives in station 94 (FIG. 4A), swell detector 170 pushes enlarged head 178 against the wall of container 66. Before the container is inflated, the walls of the container are substantially flat as indicated by the straight lines 180. While the dunnage bag within the container is being inflated, the walls of the container swell outward as indicated by the curved lines 182. The deflection of the wall on which enlarged head 178 abuts against causes enlarged head 178 to move a distance d. This distance is correlated with the pressure within the bag. When a desired pressure is detected, the inflation sequence is terminated. If the distance d decreases after the completion of the inflation sequence, then it is likely that the dunnage bag has a leak. In other words, the operator can monitor the distance d after the inflation sequence and determine if there is a leak in the bag.

Figure 7A:
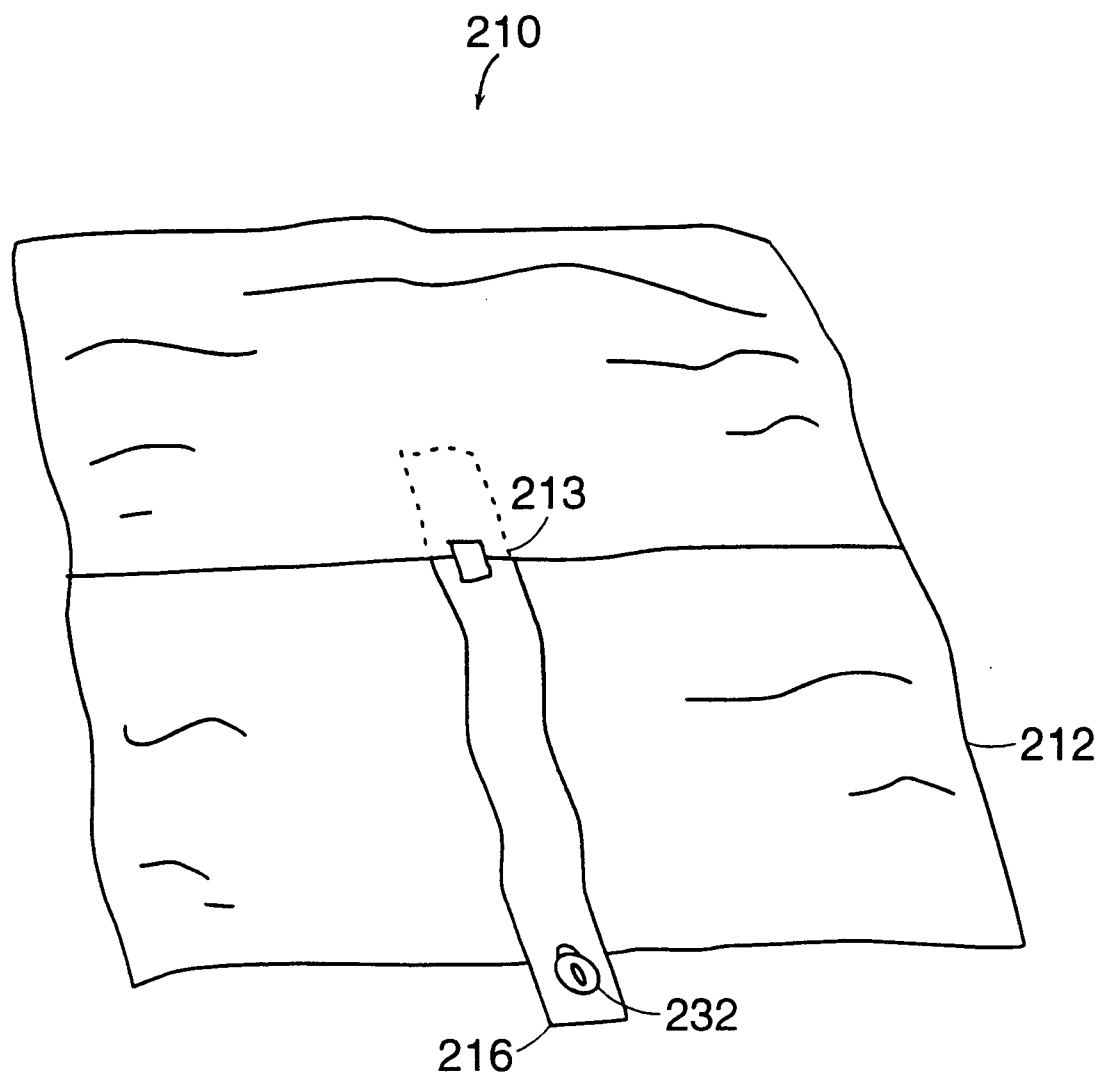
FIG. 7A is an illustration of alternative embodiment of a dunnage bag incorporating a flexible valve assembly.

Other embodiments of the dunnage bag differ slightly from the embodiment described above. For example, another embodiment shown in FIG. 7A as a dunnage bag 210 includes a flexible valve assembly 216 partially inserted into a flexible bag 212 near a center portion 213 of flexible bag 212. Flexible valve assembly 216 includes a rigid collar 232 for mounting in an opening in a wall of a container similar to the device discussed with reference to FIG. 2D. Rigid collar 232 defines an opening 240 into the flexible valve for inflating flexible bag 212. Flexible valve assembly 232 enables flexible bag 212 to conform to the void regions in container 66 carrying articles 80 for shipment without straining the region near center portion 213 when flexible bag 212 is inflated. Flexible bag 212 may include a pleat similar to that described with reference to FIG. 1.

Figure 7B:
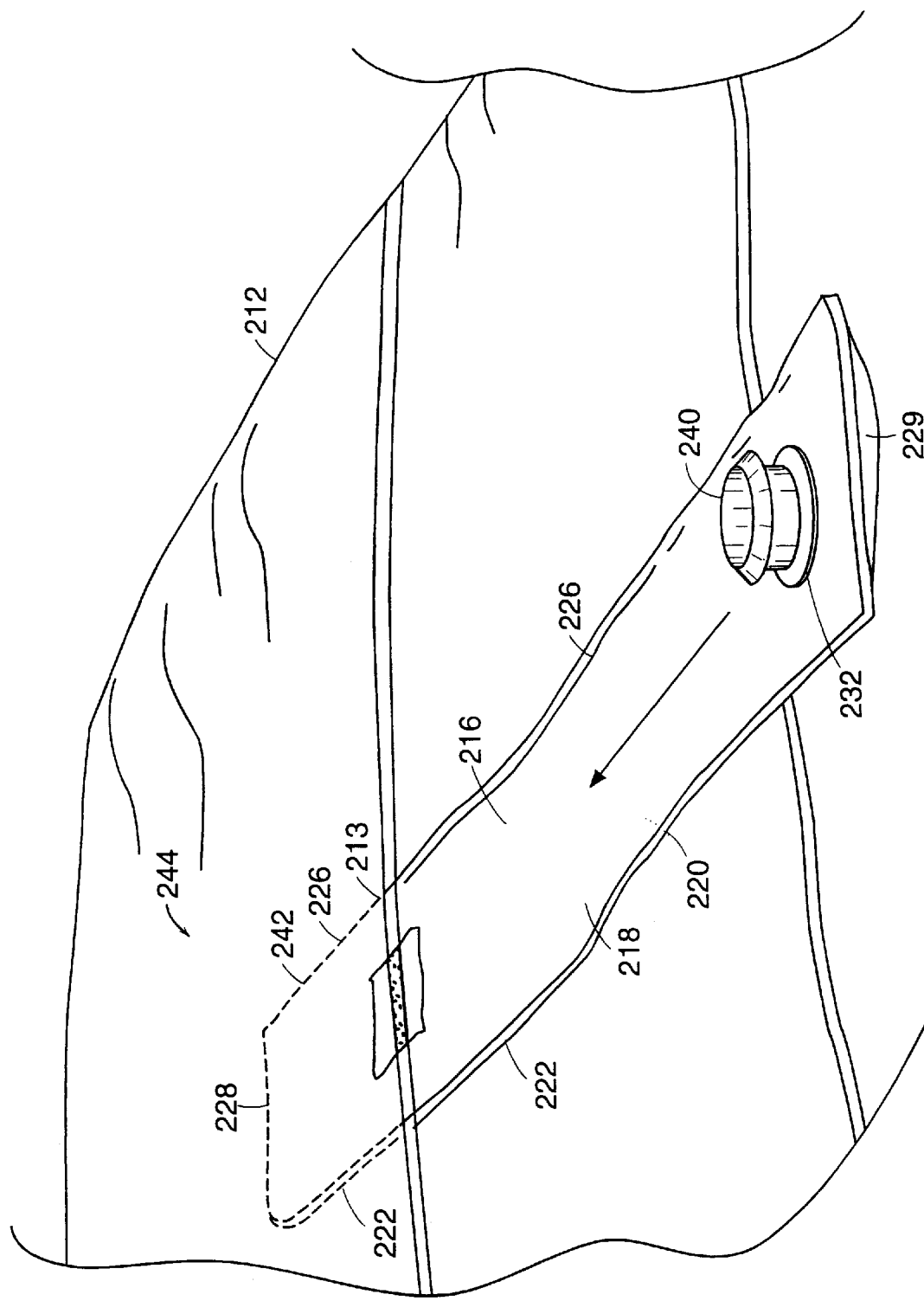
FIG. 7B is a close-up view of the flexible valve assembly of the dunnage bag of FIG. 6A.

Flexible valve assembly 216 is shown in greater detail in FIG. 7B. Flexible valve assembly 216 includes two opposed sheets 218 and 220 sealed along three edges 222, 224 and 226. Alternatively, flexible valve assembly 216 can be made from a single sheet and folded along one edge, for example edge 222, and sealed along the other two edges 224 and 226. Flexible valve assembly 216 has an open end 228 so that a passageway is defined from opening 240 of rigid collar 232 to the inside of flexible bag 212. Flexible valve 216 is bonded to flexible bag 212 near center portion 213 of the bag so that an inner portion 242 of flexible bag 212 resides inside the bag. When dunnage bag 210 is inflated, sides 218 and 220 of portion 242 are urged together by the internal pressure of the dunnage bag thereby creating a seal and preventing air from escaping.

Figure 7C:
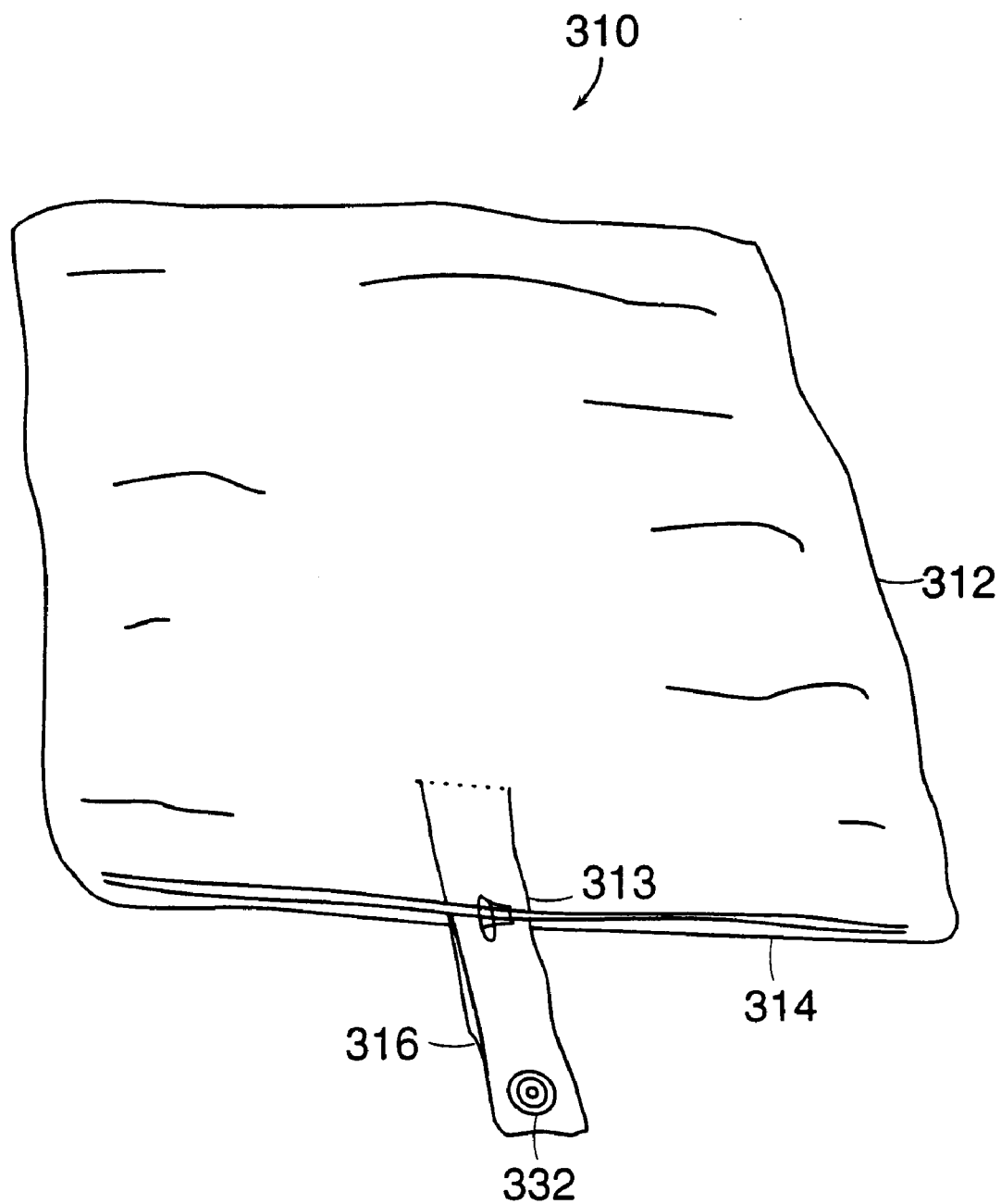
FIG. 7C is an illustration of another alternative embodiment of a dunnage bag incorporating a flexible valve assembly.

Yet another embodiment shown in FIG. 7C as a dunnage bag 310 includes a flexible valve assembly 316 partially inserted into a flexible bag 312 at an attachment region 313. Flexible valve assembly 316 also includes a rigid collar 332 which provides an opening into the flexible valve assembly. The construction and operation of flexible valve assembly 316 is similar in most respects to flexible valve assembly 216 described with reference to FIGS. 7A and 7B except for the location of the attachment region of the valve assembly to the flexible bag. Attachment region 313 is located on an edge 314 of flexible bag 312. Since attachment region 313 is typically near the location at which rigid collar 332 is mounted in an opening of a wall of a container, the amount of material required to form rigid valve assembly 316 is minimized.

Figure 8:
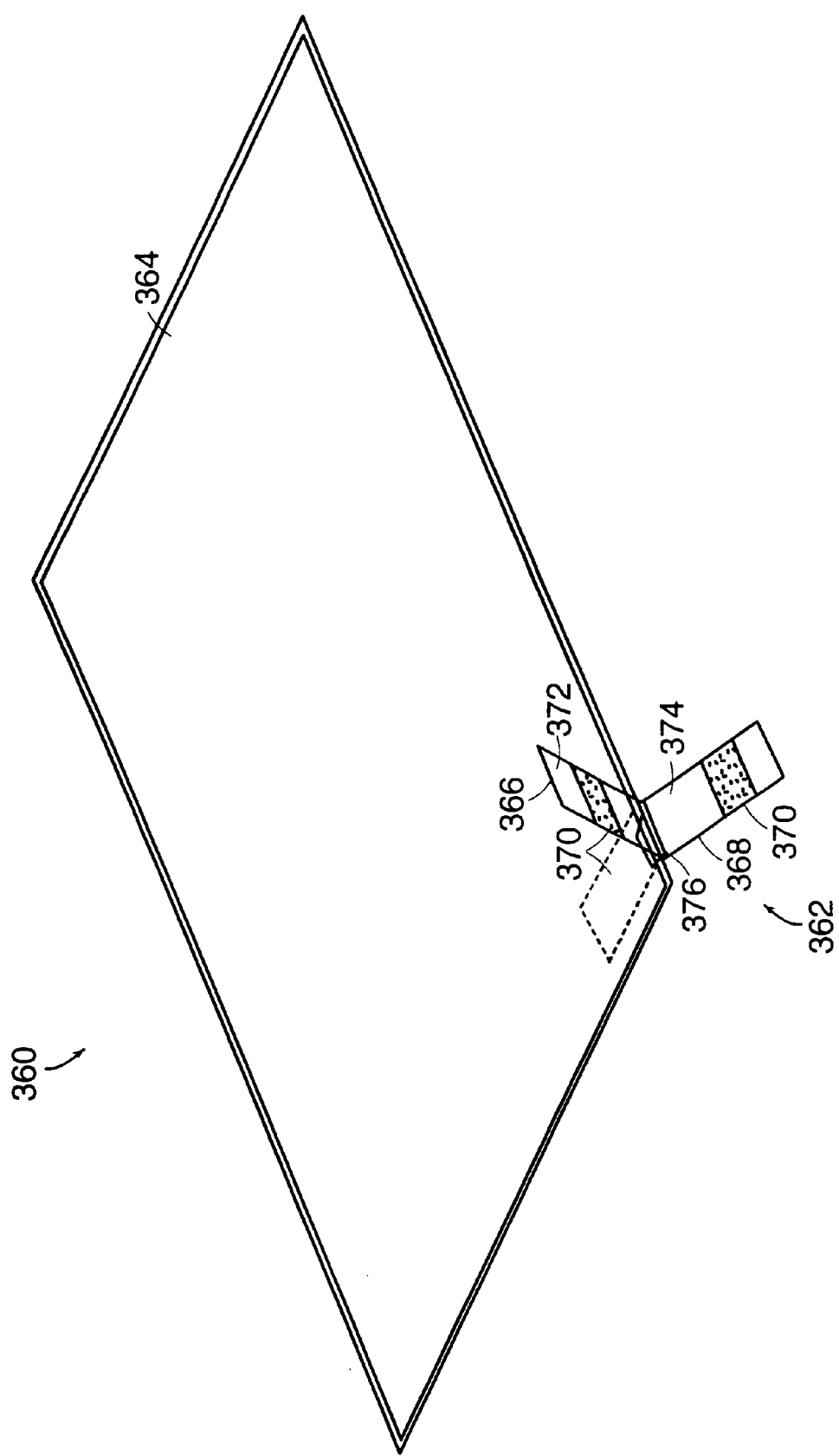
FIG. 8 is an illustration of yet another alternative embodiment of a dunnage bag incorporating a flexible valve assembly.

In another embodiment, shown in FIG. 8, a dunnage bag 360 includes a flexible valve assembly 362 partially inserted in a flexible bag 364. Flexible valve assembly 362 does not have a rigid collar, but the sealing of flexible valve assembly 362 is similar to that of the valve assembly described with reference to FIGS. 7A–7B. An outer portion 365 of flexible valve assembly 362 includes two flaps 366, 368. Each of flaps 366, 368 has an adhesive 370 applied to a respective outer surface 372, 374. When flaps 366, 368 are spread apart, the flaps define an opening 376.

To mount flexible valve assembly 362 in a wall of a container, the operator first inserts the valve assembly from the inside of the container through a slit in the wall. Next, the operator spreads flaps 366, 368 apart and pushes the flaps against the wall to cause the adhesive to adhere the flaps to the wall. During the inflation sequence, the inflating system supplies pressurized air to opening 376 to inflate dunnage bag 360.

Figure 9:
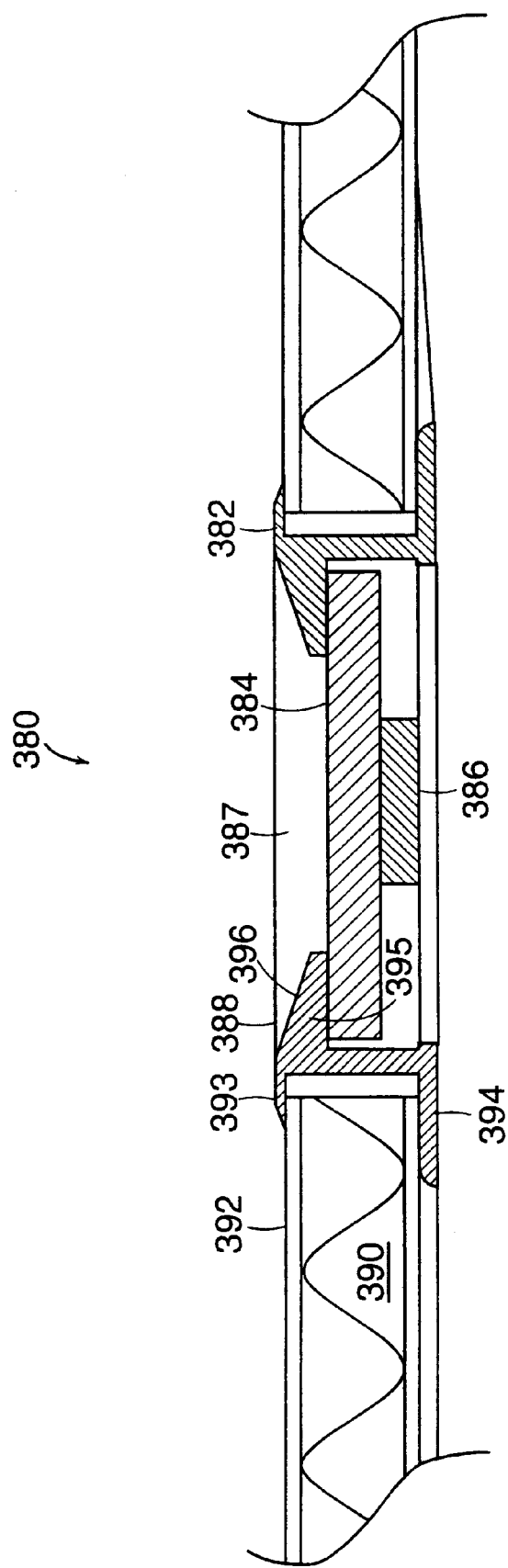
FIG. 9 is an illustration of an alternative embodiment of a rigid valve assembly.

Another embodiment shown in FIG. 9 as a rigid valve assembly 380 includes a housing 382, a circular diaphragm 384, and a retainer post 386 which secures diaphragm 384 within housing 382. The operation of rigid valve assembly 380 is similar to valve assembly 16 described with reference to FIGS. 2A–2D. Housing 382 defines a bore 386 with an entrance opening 388. Housing 382 includes an outwardly extending rim 393 and an outwardly extending shoulder 394 spaced from rim 393. An inwardly extending rim 395 of housing 382 includes a tapered surface 396.

When rigid valve assembly 380 is mounted in an opening of a wall 390, entrance opening 388 protrudes beyond an outer surface 392 of wall 390. In addition, shoulder 394 abuts against an inner surface 397 of wall 390, and rim 393 abuts against outer surface 392 to hold rigid valve assembly 380 in the opening of wall 390.

Figure 10:
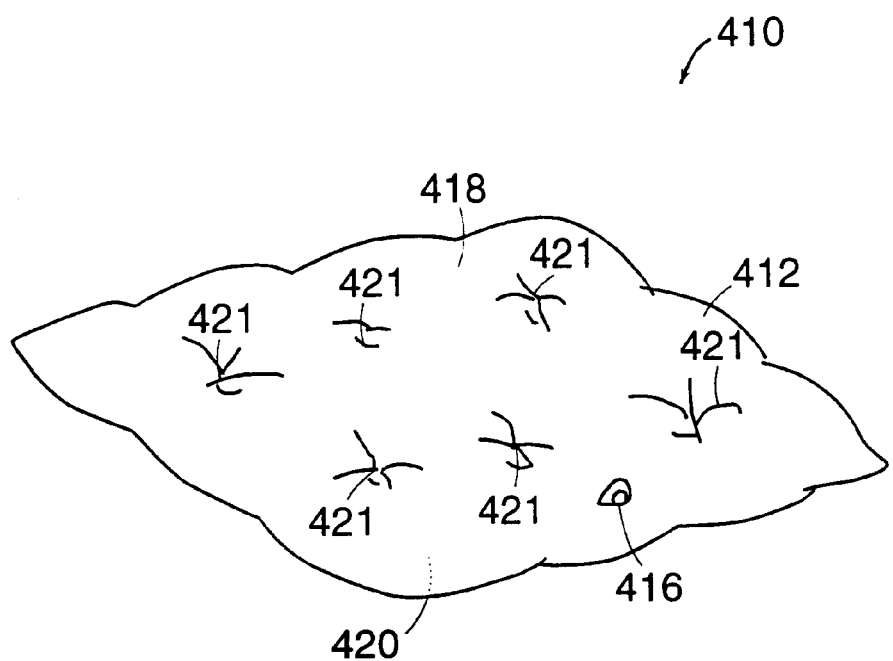
FIG. 10 is an illustration of an alternative embodiment of a dunnage bag of quilted construction.

Still another embodiment shown in FIG. 10 as a dunnage bag 410 includes a rigid valve assembly 416 connected to a flexible bag 412 having two opposed sides 418 and 420. Sides 418 and 420 are tacked together at several points 421 such that flexible bag 412 has a quilted construction. Thus opposed sides 418 and 420 remain substantially parallel to each other when flexible bag 412 is inflated. Rigid valve assembly 416 is similar to the valve assembly discussed with reference to FIGS. 2A–D. Dunnage bag 410, however, can include any one of the valve assemblies described with reference to FIGS. 7A–9. When dunnage bag 410 is placed at the bottom of a container and inflated, dunnage bag 410 acts as level quilted pad upon which an article can rest without rolling towards a wall of the container. Another dunnage bag, for example dunnage bag 10 (FIG. 1), can then be placed on top of the article without an operator having to hold the article in the center of dunnage bag 410.

Figure 11:
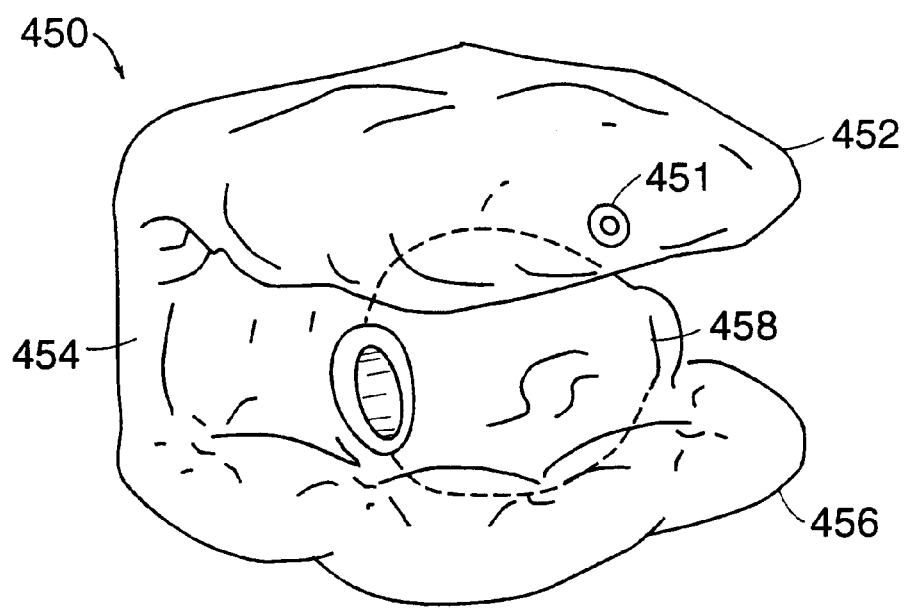
FIG. 11 is an illustration of an alternative embodiment of a composite dunnage bag.

In another embodiment shown in FIG. 11, a composite dunnage bag 450 includes a rigid valve assembly 451, and has the features of both dunnage bag 410 (FIG. 10) and dunnage bag 10 (FIG. 1). Dunnage bag 450 includes a portion 452 joined by a mid portion 454 to another portion 456. Portion 452 has a substantially smooth outer surface, and portion 456 has a quilted construction similar to the dunnage bag described with reference to FIG. 10. In use, the operator places dunnage bag 450 in the container such that portion 456 rests on the bottom of the container. Next, the operator places an article 458 on top of portion 456 and then folds portion 452 over the article. The remaining packaging sequence is identical to that described above with reference to FIGS. 4A–5.

Figure 12:
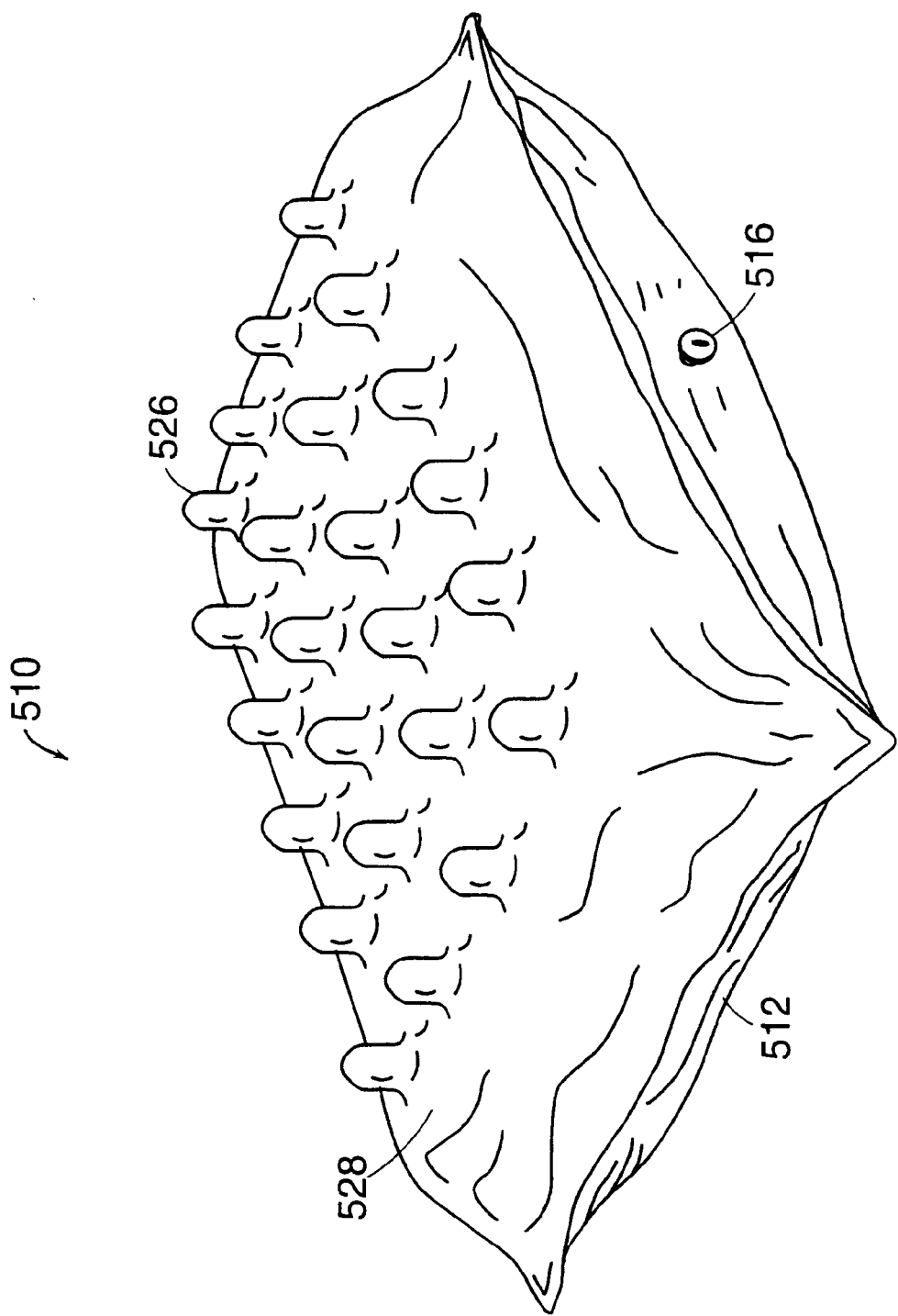
FIG. 12A is an illustration of another alternative embodiment of a dunnage bag with protrusions.
FIG. 12B is an illustration of the dunnage bag of FIG. 12A in use in a container.

In yet another embodiment shown in FIG. 12A as a dunnage bag 510 includes a flexible bag 512 which has multiple protrusions 526 extending outwardly from a surface 528 of flexible bag 512. Dunnage bag 510 also includes a rigid valve assembly 516 similar to rigid valve assembly 16 discussed previously with reference to FIGS. 2A–2D. Dunnage bag 510, as well as dunnage bag 450 (FIG. 11) can be used with any one of the valve assemblies described with reference to FIGS. 7A–9.

Figure 12B:
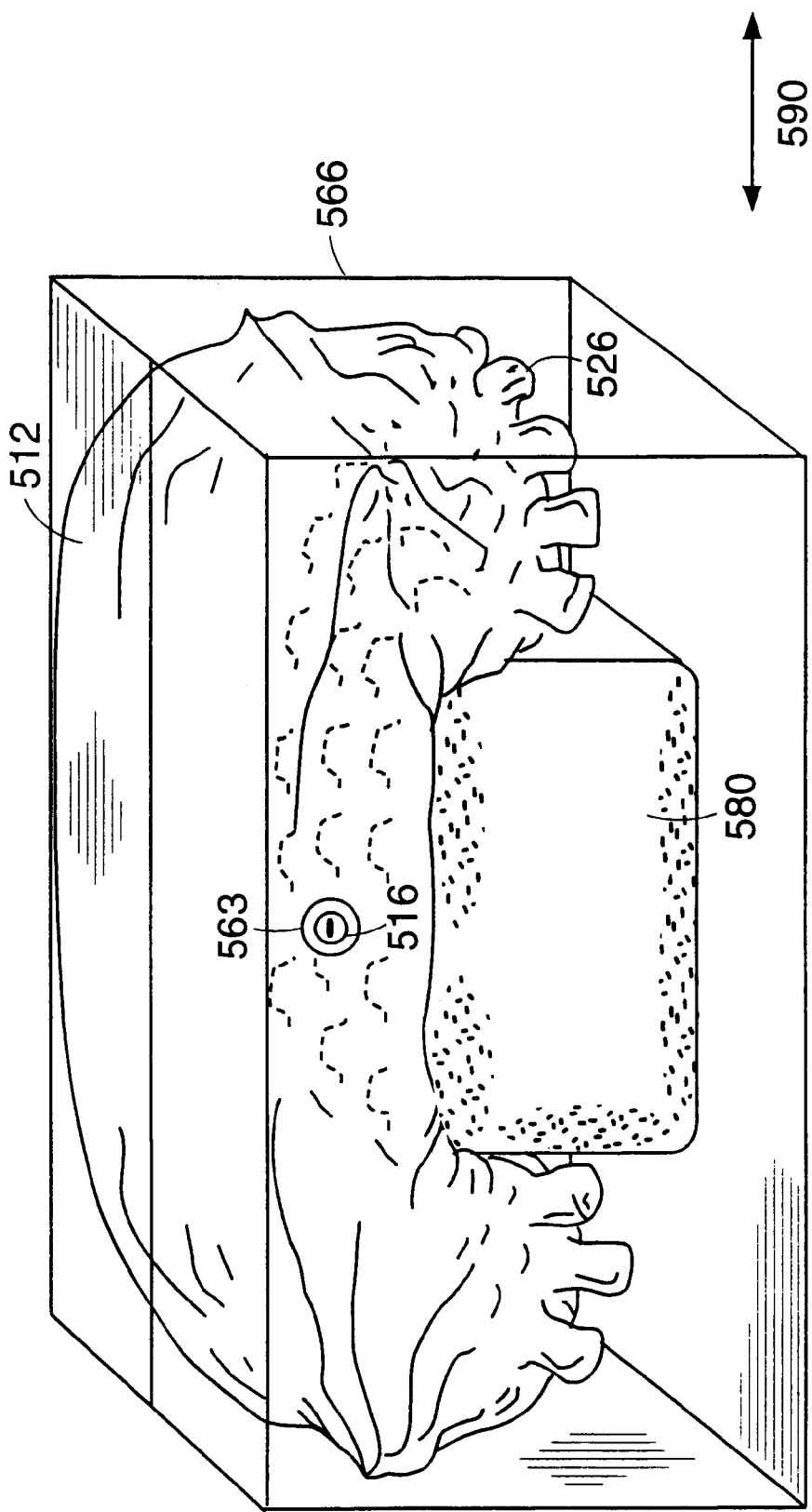

Dunnage bag 510 in use is shown in FIG. 12B where rigid valve assembly 516 of dunnage bag 510 is mounted in an opening 563 of container 566 which carries articles 580. When flexible bag 512 is inflated, protrusions 526 effectively grab article 580 by expanding into the space about article 580. Protrusions 526 prevent article 580 from shifting when side loads are applied to container 566 in the direction of arrows 590.

In other embodiments, any one of the flexible bags described above may be adhered to the interior of the container, for example, with an adhesive. Thus the combination of the flexible bag and container would form a single integrated dunnage bag.

Other embodiments are within the scope of the following claims.

What is claimed is:

1. A dunnage bag comprising:
   a sealed, flexible bag; and
   a valve assembly connected in fluid communication to the flexible bag, the valve assembly having a rigid collar which mounts in an opening in a wall of a container to receive an exit end of a fill nozzle of an inflating system which supplies pressurized gas for inflating the flexible bag, said collar defining a bore along a longitudinal axis of the collar and through which gas passes into the bag, said collar further including a flange portion located at an entrance end of the collar and a shoulder-defining portion spaced apart from the flange portion, said flange portion and said shoulder-defining portion both extending away from and circumscribing the collar in a radial direction relative to the longitudinal axis of the collar, the flange portion having a first outer diameter, the shoulder-defining portion having a second outer diameter, and the collar within a region located between the flange portion and the shoulder-defining portion having a third outer diameter, wherein the first outer diameter is smaller than the second outer diameter and larger than the third outer diameter.

2. The dunnage bag of claim 1 wherein the flexible bag includes a pleat for relieving strain on the flexible bag near the valve assembly when the dunnage bag is in use in the container.

3. The dunnage bag of claim 1 wherein the flange portion is tapered in the radial direction.

4. The dunnage bag of claim 1 wherein the rigid collar is configured so that the entrance end of the collar is recessed from an outer surface of the wall of the container when the rigid collar is mounted in the wall.

5. The dunnage bag of claim 1 wherein the rigid collar is configured so that the entrance end of the collar is flush with an outer surface of the wall of the container when the rigid collar is mounted in the wall.

6. The dunnage bag of claim 1 wherein the rigid collar further includes rim located at the entrance end of the collar and extending inwardly into and circumscribing the bore defined by the rigid collar.

7. The dunnage bag of claim 1 wherein the sealed, flexible bag has a quilted construction.

8. The dunnage bag of claim 1 wherein the falange portion circumscribes the collar in a continuous manner.

9. The dunnage bag of claim 1 wherein the shoulder-defining portion circumscribes the collar in a continuous manner.

10. The dunnage bag of claim 1 wherein the collar over the region located between the flaneg portion and the shoulder-defining portion is cylindrically-shaped.

11. The dunnage bag of claim 1 wherein the valve assembly further comprises valve mechanism mounted within the rigid collar.

12. The dunnage bag of claim 11 wherein the valve mechanism comprises a flexible membrane and a retaining bar holding the flexible membrane in the collar.

13. A dunnage bag comprising:

a sealed, flexible bag; and a valve assembly connected in fluid communication to the flexible bag at a first end of the valve assembly, the valve assembly having a flexible valve portion proximate to an exit end of the valve assembly and a rigid collar at an entrance end of the valve assembly, said collar defining a bore along a longitudinal axis of the collar, said collar further including a flange portion located at an entrance end of the collar and a shoulder-defining portion spaced apart from the flange portion, said flange portion and said shoulder-defining portion both extending away from and circumscribing the collar in a radial direction relative to the longitudinal axis of the collar, the flange portion having a first outer diameter, the shoulder-defining portion having a second outer diameter, and the collar within a region located between the flange portion and the shoulder-defining portion having a third outer diameter, wherein the first outer diameter is smaller than the second outer diameter and larger than the third outer diameter.

14. The dunnage bag of claim 13 wherein the flexible bag includes a pleat for relieving strain on the flexible bag near the valve assembly when the dunnage bag is in use in the container.

15. The dunnage bag of claim 13 wherein the rigid collar is configured so that an entrance end of the rigid collar is flush with an outer surface of the wall of the container when the rigid collar is mounted in the wall.

16. The dunnage bag of claim 13 wherein the rigid collar is configured so that an entrance end of the collar is recessed from an outer surface of the wall of the container when the rigid collar is mounted in the wall.

17. The dunnage bag of claim 13 wherein the rigid collar is configured so that the entrance end of the collar protrudes from an outer surface of the wall of the container when the rigid collar is mounted in the wall.

18. The dunnage bag of claim 13 wherein the flexible bag includes two opposed sides and the valve assembly is connected to the flexible bag near a center region of one of the two opposed sides.

19. The dunnage bag of claim 13 wherein the flexible bag includes two opposed sides and the valve assembly is connected to the flexible bag near an edge of the flexible bag.

20. The dunnage bag of claim 13 wherein the sealed, flexible bag has a quilted construction.

21. A package comprising:

a container;

a sealed, flexible bag disposed within the container; and a valve assembly connected in fluid communication to the flexible bag, the valve assembly having a rigid collar which is mounted in an opening in a wall of the container to receive an exit end of a fill nozzle of an inflating system which supplies pressurized gas for inflating the flexible bag, said collar defining a bore along a longitudinal axis of the collar and through which gas passes into the bag, said collar further including a flange portion located at an entrance end of the collar and a shoulder-defining portion spaced apart from the flange portion, said flange portion and said shoulder-defining portion both extending away from and circumscribing the collar in a radial direction relative to the longitudinal axis of the collar, the flange portion having a first outer diameter, the shoulder-defining portion having a second outer diameter, and the collar within a region located between the flange portion and the shoulder-defining portion having a third outer diameter, wherein the first outer diameter is smaller than the second outer diameter and larger than the third outer diameter.

* * * * *